March 27, 1962  J. P. FRANCIS  3,026,886
FLUID SEAL WINDSHIELD WEATHER PROTECTOR
Filed Nov. 17, 1959

INVENTOR
John P. Francis

United States Patent Office 3,026,886
Patented Mar. 27, 1962

3,026,886
FLUID SEAL WINDSHIELD WEATHER
PROTECTOR
John P. Francis, 20 Boston St., Haverhill, Mass.
Filed Nov. 17, 1959, Ser. No. 853,507
2 Claims. (Cl. 135—5)

This invention relates generally to automobile windshield weather protectors and more particularly to a weather protector which is supported from a horizontal supporting arm exending outwardly from a vertical supporting post, and adapted for use in a drive-in parking area such as a drive-in theatre, an object thereof being to provide an extremely simple, practical, sturdy and exceedingly economical weather protector structure for the complete weather protection of the general windshield area of an automobile, in providing and maintaining clear vision at all times during inclement weather conditions.

Another object of this invention is to provide a windshield weather protector structure, whereby the protector panel is adapted to engage the lateral portion of the roof top of an automobile in friction supporting and fluid sealing engagement therewith.

A further object of this invention is to provide a flexible awning or protector adapted to be vertically suspended as a drop curtain for vertical and angular adjustment and adapted further to be axially movable 90 degrees, either way, from an "in use" position to an "out of use" position which is parallel with the parked automobile.

A still further object of this invention is to provide a weather protector structure which is very easily assembled, adjusted, attached to and detached from the lateral portion of the roof top of an automobile, with the height adjustment providing unobstructed vision for all the other automobile occupants in the parking area against any height obstruction, over and above the roof tops, while viewing outdoor movies or the like.

With these objects and still further objects in view, as will hereinafter more fully appear, the invention comprises certain novel constructions, combination and arrangement of parts, and novel functional features, hereinafter described and claimed, and illustrated in the accompanying drawings, in which:

Figure 1:
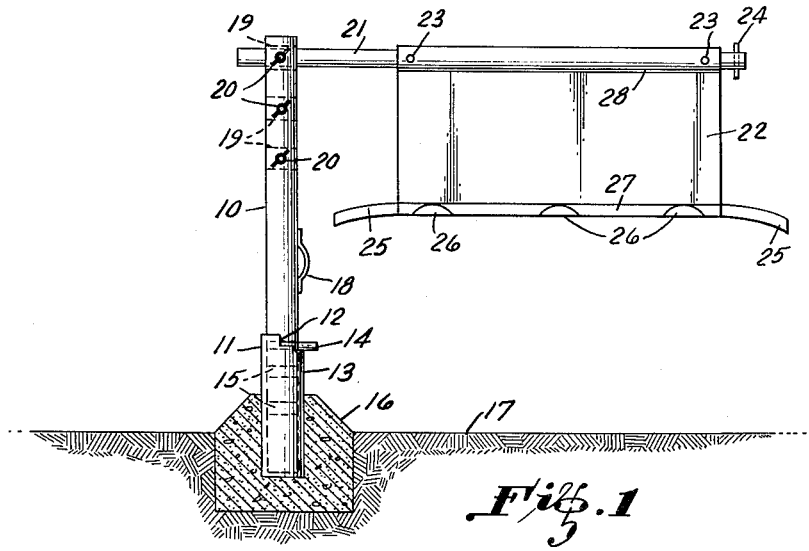
FIGURE 1 is a front elevation view of the device showing the panel suspended prior to attachment to the roof top of an automobile, as shown in FIGURE 2.

Referring now in detail to the drawings, in FIGURE 1 a vertical supporting post 10 is shown mounted within an outer cylinder or post 11 which is supported by concrete anchoring means 16 anchored in the ground 17, or supported upon the ground level for movable adjustment. A removable combination stop and post supporting pin 14 extends through one of the lower cross bores 15, of post 10, for vertical and axial adjustment of the said post 10. On the upper portion of outer post 11, there are formed opposing shoulders 12 to limit the approximately 90 degree axial movement of post 10, clockwise or counter-clockwise, from the lower central recess 13. The lower central recess 13 is adapted to secure the post 10 more firmly in the "in use" position against any wind pressure or the weight of the falling precipitation on the positioned panel 22, when the said combination stop and supporting pin 14 is engaged in the recess 13. A handle 18, attached to the post 10, is provided so that the said post 10 may be axially rotated for the use or non-use of the weather protector and for any vertical adjustment thereof.

A vertical supporting post with a horizontal supporting arm extending therefrom, and an awning with a rain sealing curtain having curtain securing means, is shown and described in my copending application, Serial No. 734,080, filed May 6, 1958, now Patent No. 2,926,678. My invention therefore is primarily concerned with the rain panel and securing means thereof forming a fluid seal windshield weather protector.

Figure 2:
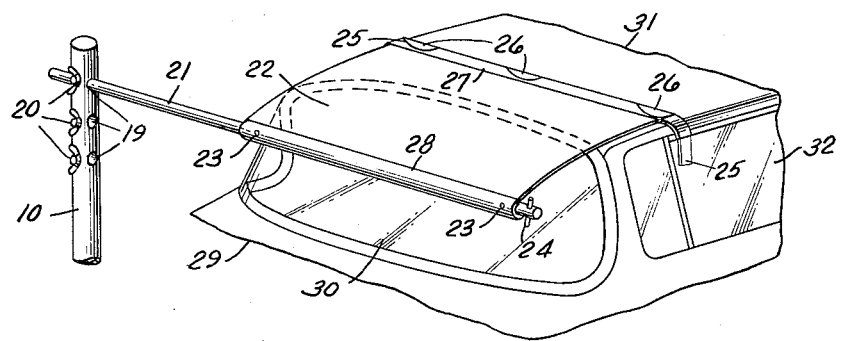
FIGURE 2 is a side elevation fragmentary view of the automobile showing the panel supported in fluid sealing engagement with the lateral portion of the roof top.

The vertical supporting post 10, FIGURES 1 and 2, is provided wtih upper cross bores 19 for the adjustable support and the vertical height adjustment of the horizontal supporting arm 21 therethrough and secured in the desired position of alignment by the thumb screw 20.

Attached to the horizontal supporting arm 21, FIGURES 1 and 2, is a weather protector or fabric weather panel 22 supported by the top hem 28 and secured in position to the supporting arm 21 by one or more pins 23. The pins 23 may be eliminated so that the hem 28 of panel 22 is slidably adjusted on the supporting arm 21 to retract or extend the said panel 22 for the "out of use" or "in use" positions of adjustment. A removable end stop 24 attached to the arm 21 serves as a stop member for limiting the outward movement of the panel 22 thereon.

The flexible water repellent panel 22, made of fabric or other suitable flexible material, has a lower hem 27 and opposing tab end members 25 extending outwardly of the said panel 22. Within the hem 27 are spaced apart metal magnetized members 26 adapted to adjustably engage the lateral portion of the roof top 31 of an automobile 29, in friction supporting engagement, as shown in FIGURE 2.

The tab end members 25, of which there may be any number of the said members along the hem 27 for engaging automobiles of extremely small lateral widths, are adapted to engage preferably the windows 32 of the side doors, as shown in FIGURE 2, or engage the side doors and the body frame, thereby forming and tensioning the lateral contour of the panel 22 to engage in friction and fluid sealing engagement with the lateral contour of the roof top of the said automobile. The tab end members 25 provide additional support for the panel 22 against bad weather conditions such as strong winds, heavy rain, sleet or snowfall.

Figure 3:
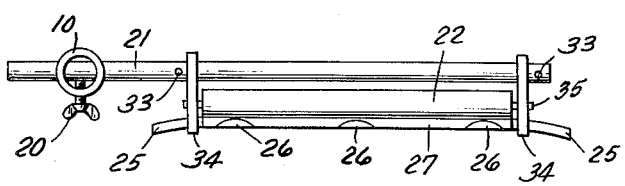
FIGURE 3 is a top plan view of a modified form of a weather panel supported as a vertically adjustable roll curtain.

In FIGURE 3, there is shown a modified form of a weather protector, with the weather panel 22 being supported upon a spring tensioned roller 35, such as commonly used on window shades, and supported upon the removable end brackets 34, and secured in position by the stop members 33 on arm 21. When not in use, the horizontal supporting arm 21 may be moved to the "out of use" position which is parallel to the parked automobile. For use, due to inclement weather, the supporting arm 21 is then rotated 90 degrees, upon axial movement of the supporting post 10, from the stowed position to the "in use" position. The weather panel 22 is then pulled downwardly from the roller 35 and then rearwardly over the roof top of the automobile and adjustably secured thereto, as shown in FIGURE 2, to provide fluid sealing engagement whereby rain, sleet or snow, or any force of wind, will not pass under the weather panel 22 and onto the windshield area 30, upon the adjustable engagement of panel 22 to the automobile.

Referring back to FIGURE 1, the panel 22 is shown suspended, with the post 10 and the horizontal supporting arm 21 in the "in use" position. The arm 21, if accidently struck by the automobile entering or departing, due to either the extreme height of the automobile or any projections extending above the vehicle, or due to the low position of the horizontal supporting arm 21, is adapted to pivot 90 degrees forwardly or rearwardly to prevent any damage to the automobile or the weather protector structure. This movement is adapted to take place when the occupant does not rotate the arm 21 to the stowed or "out of use" position, prior to leaving the parking area. The arm 21 may be erected at a permanent pre-set horizontal height, sufficient to clear any automobile roof top, providing, however, that the viewing of the movie screen is not affected thereby to any of the automobile occupants in the area. Also upon sufficient movement of the automobile, with panel 22 attached, the supporting arm 21 is forced from the "in use" position, with the self-release friction engaging members 25 or 26 becoming disengaged from the moving automobile.

The extreme simplicity of the structural and functional features of this device; the minimum number of elements; the very simple erection and operation thereof; the economical initial cost, upkeep and stowage; and, the safety, extreme comfort, pleasure, and savings; all being of benefit to the management and the automobile occupants. It is therefore, that clear and complete windshield vision is provided without any on or off or continuous automobile engine noise, windshield wiper vision blur, or windshield wiper noise created by the automobile or adjacent automobiles during inclement weather conditions.

Aluminum construction is preferable in providing an extremely light and very easy to handle weather protector device, whereby any movement or adjustment of the structure may be easily handled.

Having thus described my invention, I desire to add that changes may be made in one embodiment alone, or combined in one embodiment with the other.

Changes, therefore, in the construction and the arrangement, may be made without departing from the spirit and the scope of the invention as disclosed in the appended claims.

I claim:
1. A fluid seal automobile windshield weather protector adapted for erection and use in a drive-in parking area such as a drive-in theatre comprising, a vertical supporting post, a horizontally mounted supporting arm extending from the said vertical supporting post, a laterally adjustable and laterally retractable flexible water repellent awning panel freely supported and vertically suspended from the said laterally positioned horizontal supporting arm, said freely suspended panel adapted to be moved from the said normal vertical position and pivotally extended upwardly and rearwardly about 90° around and from the longitudinal axis of said horizontal supporting arm, said pivotal panel movement providing longitudinal supporting engagement with the lateral contour of the roof top of a rearwardly spaced apart parked automobile for lateral friction supporting and rain sealing engagement thereto, and a flexible lateral outer end tab securing member extending outwardly of each of the corner portions of said lateral free end of said panel and adapted to be adjustably and frictionally engaged to the automobile body portion for instant self-release either from within or upon sufficient movement of the automobile, said tab members adapted to adjustably compress the said lateral free end portion of the said panel downwardly and laterally taut on said roof top upon pulling each of the said tab members downwardly and then inwardly within the automobile, said laterally opposed tab members being frictionally engaged and releasably disengaged between the movable windows on the doors of the automobile body portion, said disengagement of said tab securing members adapted to occur either upon said movement of the windows or upon movement of the parked automobile in providing sliding disengagement therefrom.

2. A fluid seal automobile windshield weather protector adapted for erection and use in a drive-in parking area such as a drive-in theatre comprising, an outer vertical cylindrical supporting member, an inner vertical supporting post adjustably supported by said outer member, stop means movable with and extending outwardly from the axially adjustable said inner supporting post to limit axial adjustment of the free axial movement of said inner post, a shoulder formed on the said outer vertical supporting member to restrain the free movement and to limit the travel of said stop means, a horizontally amounted supporting arm extending from the said axially adjustable inner supporting post, a spring actuated roller supported from the said horizontal supporting arm, a flexible longitudinally movable water repellent awning panel coiled around and supported from the said roller, said panel adapted to be pulled and extended rearwardly in a substantially horizontal plane to flexibly engage the lateral contour of the roof top of a rearwardly spaced apart parked automobile for lateral friction supporting and rain sealing engagement thereto, and a flexible lateral outer end tab securing member extending outwardly of each of the corner portions of said lateral free end of said panel and adapted to be adjustably and frictionally engaged to the automobile body portion for instant self-release either from within or upon sufficient movement of the automobile, said tab members adapted to adjustably compress the said lateral free end portion of the said panel downwardly and laterally taut on said roof top upon pulling each of the said tab members downwardly and then inwardly within the automobile, said laterally opposed tab members being frictionally engaged and releasably disengaged between the movable windows and panel parts of the doors of the automobile body portion, said disengagement of said tab securing members adapted to occur either upon said movement of the windows or upon movement of the parked automobile in providing sliding disengagement therefrom.

References Cited in the file of this patent
UNITED STATES PATENTS

| | | |
|---|---|---|
| 2,212,326 | Piken | Aug. 20, 1940 |
| 2,315,680 | Ward | Apr. 6, 1943 |
| 2,639,751 | Flaherty | May 26, 1953 |
| 2,694,231 | Bermejo | Nov. 16, 1954 |
| 2,812,208 | Francis | Nov. 5, 1957 |
| 2,853,129 | Leavitt et al. | Sept. 23, 1958 |
| 2,869,562 | Francis | Jan. 20, 1959 |

FOREIGN PATENTS

| | | |
|---|---|---|
| 525,202 | Canada | May 22, 1956 |